United States Patent
Krom et al.

(10) Patent No.: US 10,279,321 B2
(45) Date of Patent: May 7, 2019

(54) SODA MACHINE PRONGED CLAMP WITH INTEGRAL PRESSURE LOCK

(71) Applicant: SodaStream Industries Ltd., Ben Gurion Airport (IL)

(72) Inventors: Doron Krom, Zikhron Yaacov (IL); Hagai Harduff, Binyamina (IL); Eyal Shmueli, Reut (IL); Amit Avigdor, Moshav Nitzanei Oz (IL); Allan Ring, Mercaz Shapira (IL); Avi Cohen, Jerusalem (IL)

(73) Assignee: Sodastream Industries Ltd., Lod (IL)

( * ) Notice: Subject to any disclaimer, the term of this patent is extended or adjusted under 35 U.S.C. 154(b) by 276 days.

(21) Appl. No.: 15/376,684

(22) Filed: Dec. 13, 2016

(65) Prior Publication Data
US 2017/0165619 A1 Jun. 15, 2017

Related U.S. Application Data (60) Provisional application No. 62/266,625, filed on Dec. 13, 2015.

(51) Int. Cl.
*B01F 3/04* (2006.01)
*A23L 2/54* (2006.01)
*B01F 15/00* (2006.01)

(52) U.S. Cl.
CPC ............ *B01F 3/04794* (2013.01); *A23L 2/54* (2013.01); *B01F 15/00746* (2013.01)

(58) Field of Classification Search
CPC ........ B01F 3/04794; B01F 2003/04822; A23L 2/54
See application file for complete search history.

(56) References Cited

U.S. PATENT DOCUMENTS

| 4,304,741 | A | 12/1981 | Avison et al. |
| 4,610,282 | A | 9/1986 | Brooks et al. |
| 8,920,860 | B2 | 12/2014 | Ring et al. |
| 2003/0075813 | A1 | 4/2003 | Kiefer |
| 2013/0037969 | A1 | 2/2013 | Ring et al. |
| 2015/0367296 | A1 | 12/2015 | Cohen et al. |

FOREIGN PATENT DOCUMENTS

| CN | 2318947 | 5/1999 |
| CN | 204529261 | 8/2015 |
| JP | 5362886 | 6/1978 |

OTHER PUBLICATIONS

International Search Report for corresponding PCT application PCT/IB2016/057558 dated Apr. 4, 2017.

*Primary Examiner* — Robert A Hopkins
(74) *Attorney, Agent, or Firm* — Pearl Cohen Zedek Latzer Baratz LLP (57) ABSTRACT

A pronged clamp apparatus for attaching a soda bottle to a home use carbonation machine, the apparatus includes a pronged clamp to receive the bottle, at a non-upright position prior to carbonation, the bottle having a neck ring, to attach the bottle to the carbonation machine when a user moves said bottle towards an upright position; a locking mechanism to lock the bottle to the carbonation machine via the neck ring in the upright position during carbonation; and an interlock operative within the locking mechanism utilizing the downward movement of the bottle under pressure to prevent the unlocking of the locking mechanism when there is excess pressure in the bottle.

7 Claims, 13 Drawing Sheets

SODA MACHINE PRONGED CLAMP WITH INTEGRAL PRESSURE LOCK

CROSS REFERENCE

This application claims benefit from U.S. Provisional Patent Application No. 62/266,625, filed 13 Dec. 2015, which is hereby incorporated in its entirety by reference.

FIELD OF THE INVENTION

The present invention relates to carbonation machines generally and to clamping devices for attaching bottles to the machines in particular.

BACKGROUND OF THE INVENTION

Soda machines for the carbonation of beverages are known in the art. Most such devices for home carbonation are designed for manual operation. The user typically attaches a bottle of water to a carbonation head and then manually releases CO2 into the bottle of water, via a gas release valve, from an attached pressurized cylinder. Such machines typically also comprise one or more safety pressure release valves which are designed to vent if excess pressure builds up during the carbonization process.

Figure 1A:
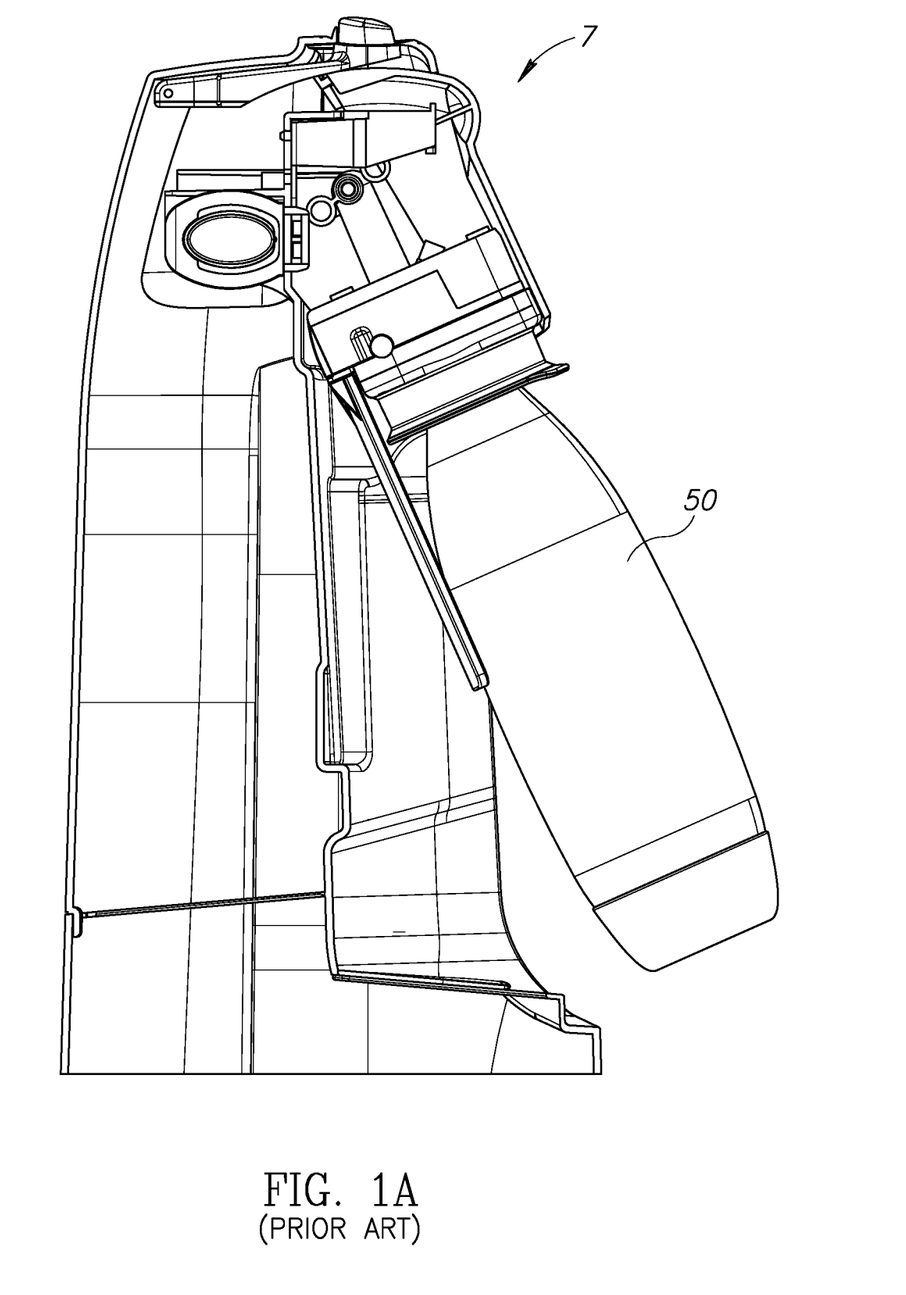
FIGS. 1A and 1B are schematic illustrations of an apparatus for attaching a soda bottle to a soda machine.
Figure 1B:
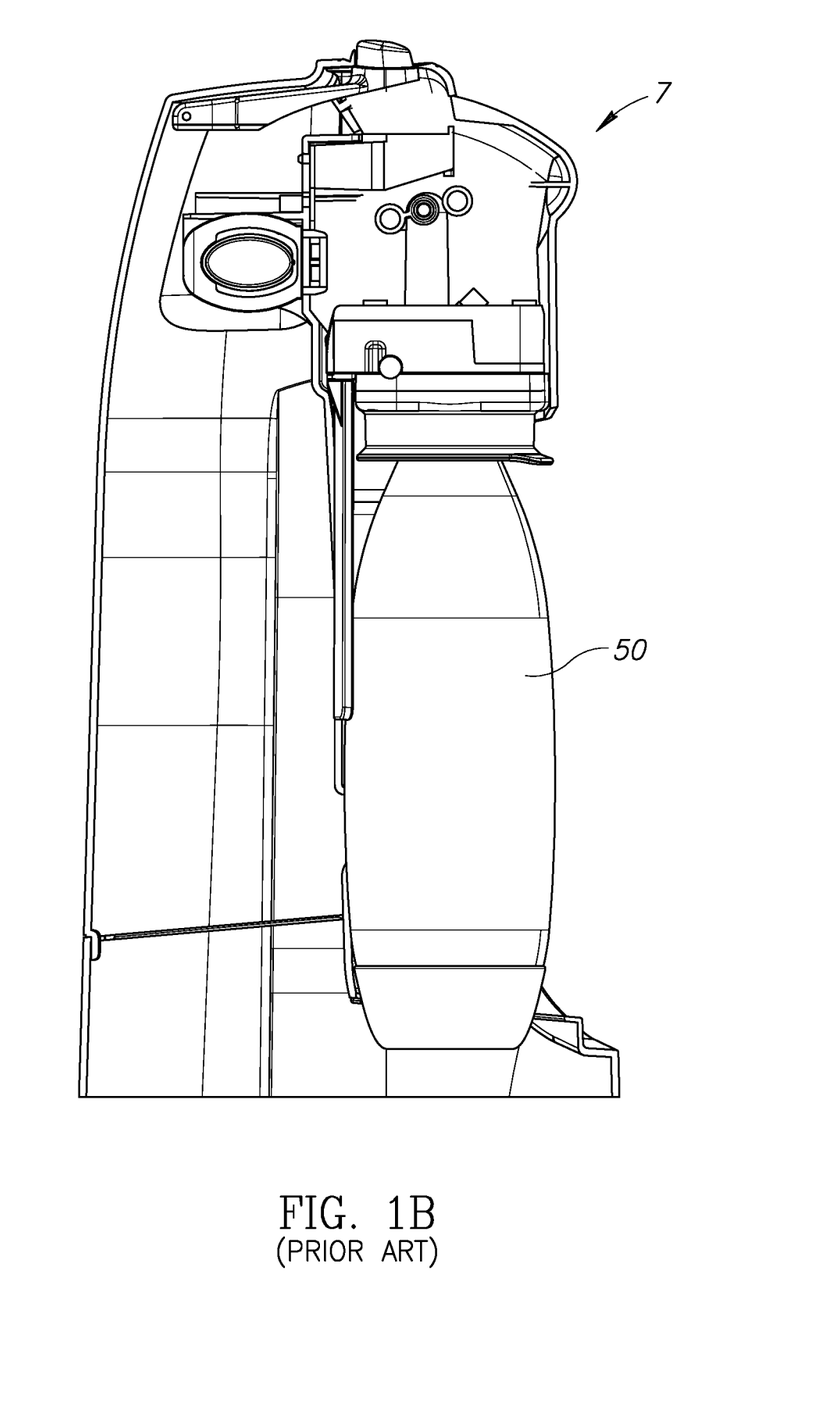

U.S. Pat. No. 8,920,860, assigned to the common assignee of the present invention and hereby incorporated in its entirety by reference, discloses a flower-like, pronged clamp apparatus for attaching a soda bottle to a soda machine. As is illustrated in FIG. 1A, to which reference is now made, the user may attach a bottle 50 to a soda machine 7 at an angle to soda machine 7. Once bottle 50 has been moved to an upright position (FIG. 1B) (carbonating position) it is held in place and a mechanical lock may prevent the user from moving bottle 50 back to the angled position until carbonation has ended. Once carbonation has ended, the user may move bottle 50 to the angled position releasing bottle 50.

SUMMARY

There is provided, in accordance with an embodiment of the present invention, a pronged clamp apparatus for attaching a soda bottle to a home use carbonation machine. The apparatus includes a pronged clamp to receive the bottle, at a non-upright position prior to carbonation, the bottle having a neck ring, to attach the bottle to the carbonation machine when a user moves the bottle towards an upright position; a locking mechanism to lock the bottle to the carbonation machine via the neck ring in the upright position during carbonation; and an interlock operative within the locking mechanism utilizing the downward movement of the bottle under pressure to prevent the unlocking of the locking mechanism when there is excess pressure in the bottle.

Moreover, in accordance with an embodiment of the present invention, the pronged clamp includes a plurality of equal sized teeth.

Further, in accordance with an embodiment of the present invention, the interlock includes two lockable teeth each having an angled upper surface and where the two lockable teeth are attached to the pronged clamp and where the two lockable teeth are sized and shaped differently from the equal sized teeth; and where the two lockable teeth are situated on opposing sides of the pronged clamp.

Still further, in accordance with an embodiment of the present invention, the apparatus also includes a locking ring having a locking protrusion to engage with the two lockable teeth when extended outwards when the bottle is pushed downwards by the excess pressure.

Additionally, in accordance with an embodiment of the present invention, the apparatus includes a cam to lower the locking ring; a lever to activate the cam and springs to raise the locking ring, the springs having a set force to raise the locking ring when there is no pressure in the bottle; and where the engaged two lockable teeth prevent the springs from raising the locking ring.

Moreover, in accordance with an embodiment of the present invention, the interlock includes two plungers situated perpendicularly to the pronged clamp; two apertures sized to fit the plungers; and plunger springs to contract under pressure to push the two plungers through the two apertures.

Moreover, in accordance with an embodiment of the present invention, the locking mechanism includes a locking ring: and where the apparatus also includes a cam to lower the locking ring; a lever to activate the cam; and springs to raise the locking ring, the springs having a set force to raise the locking ring when there is no pressure in the bottle; and where the two plungers situated within the apertures prevent the springs from raising the locking ring.

There is provided, in accordance with an embodiment of the present invention, a method for a home carbonation machine; the method includes receiving a bottle having a neck ring; attaching the bottle to the carbonation machine when a user moves the bottle towards an upright position during carbonation, locking the bottle in the upright position during carbonation; and after carbonation, utilizing the downward movement of the bottle due to pressure and preventing the removal of the bottle from the carbonation machine after carbonation when there is excess pressure in the bottle.

Moreover, in accordance with an embodiment of the present invention, the locking includes lowering a locking ring having a locking protrusion over the neck ring and gripping the neck ring with a pronged clamp, the pronged clamp having equally sized teeth and two lockable teeth.

Further, in accordance with an embodiment of the present invention, the method also includes holding the bottle in the air via the neck ring.

Still further, in accordance with an embodiment of the present invention, the preventing includes engaging the lockable teeth between the locking protrusion and the neck ring when the excess pressure pushes the bottle downwards.

There is provided, in accordance with an embodiment of the present invention, a pronged clamp for a attaching a soda bottle to a home use carbonation machine; the pronged clamp includes a plurality of equally sized teeth; two lockable teeth where the lockable teeth are sized and shaped differently from the equal sized teeth, each lockable tooth having an angled surface; and where the two lockable teeth are situated on opposing sides of the pronged clamp.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that the release of the bottle from the flower-like pronged clamp apparatus, such as that as described herein above is mechanically dependent on the end of the carbonation process itself and does not take into account that after carbonation, it may take time until all of the pressure has been released from the bottle. Although most home carbonation systems typically have built-in safety features such as exhaust and/or normally open valves to ensure that all pressure is released from the system, a user may still release a bottle from the soda machine before the bottle is completely depressurized. This may cause a dangerous "rocket effect" in which the bottle, once released, may fly away at high speed.

Figure 2:
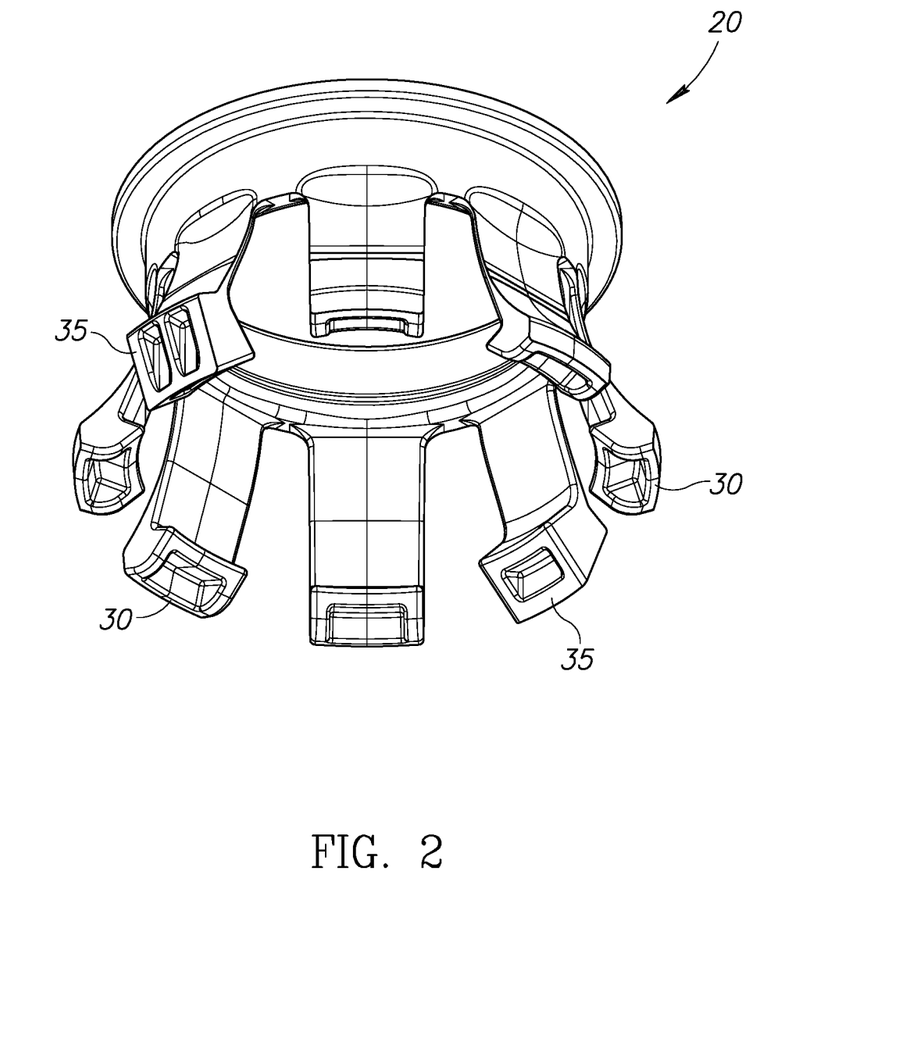
FIG. 2 is a schematic illustration of a pronged clamp, constructed and operative in accordance with the present invention.

Applicants have further realized that the home soda machine may be improved by adding an integral locking system which may only allow the pronged clamp to open and release the bottle once all the pressure in the system has been relieved, even if the user attempts release it as described herein above. Reference is now made to FIG. 2 which illustrates a pronged clamp 20, constructed and operative in accordance with a preferred embodiment of the present invention. Pronged clamped 20 may comprise several regular teeth 30 and two unique, lockable teeth 35 which may differ from regular teeth 30 in both size and shape. For example, lockable teeth 35 may be typically larger than teeth 30.

Figure 3A:
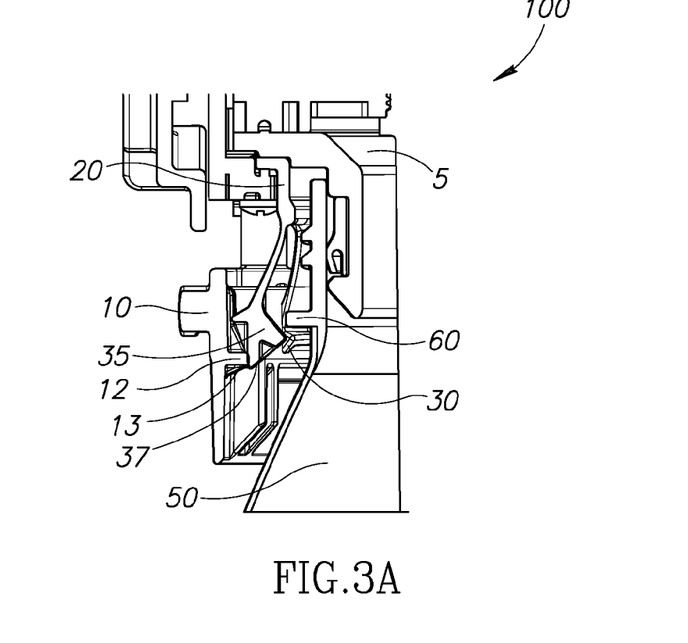
FIGS. 3A and 3B are schematic illustrations of a section of pronged clamp apparatus, constructed and operative in accordance with the present invention.
Figure 3B:
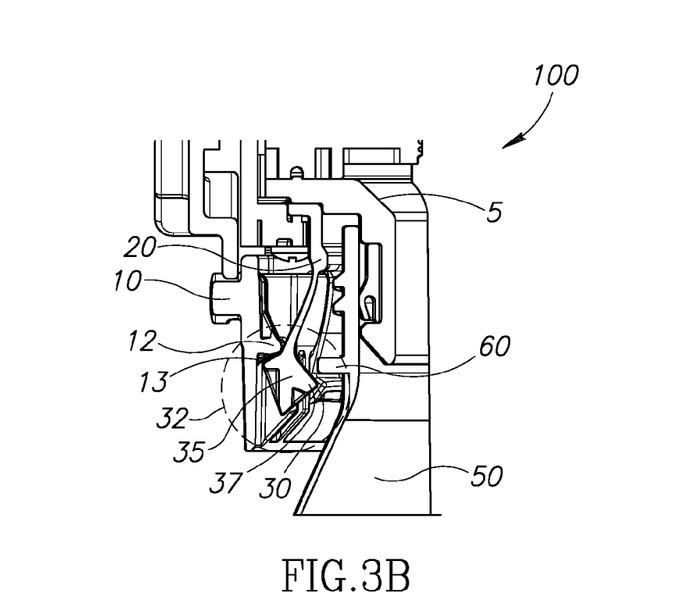

Reference is now made to FIGS. 3A and 3B which schematically illustrate a section of an improved pronged clamp apparatus 100, constructed and operative in accordance with a preferred embodiment of the present invention. Apparatus 100 may comprise a carbonation head lower 5, a locking ring 10 with a locking protrusion 12 and pronged clamp 20 with at least one enlarged lockable tooth 35. Apparatus 100 may operate to lock at least one lockable tooth 35 between a locking protrusion 12 and a neck ring 60 of a bottle 50 when there is pressure in bottle 50, as described in more detail herein below.

FIG. 3A illustrates apparatus 100 at the pre-carbonation stage before bottle 50 is attached with carbonation head lower 5 tilted outwards. FIG. 3B illustrates apparatus 100 during carbonation with bottle 50 in position in an upright position. Prior to carbonation and during attachment, bottle 50 may be pushed past the teeth of clamp 20 (including past teeth 35) and against carbonation head lower 5. In this position, locking protrusion 12 of locking ring 10 may be higher than teeth 35.

In order to carbonate, locking ring 10 may be lowered, such that an angled front surface 13 of locking protrusion 12 may slide over an angled back surface 37 of teeth 35. During the carbonation process, the excess pressure in bottle 50 may push bottle 50 back downwards thereby pushing neck ring 60 against an angled upper surface 37 of teeth 35, which may push locking teeth 35 outwards and against angled surface 13 of protrusion 12, thereby locking teeth 35 between neck ring 60 and protrusion 12. Any attempt to move locking ring 10 up will not work, since locking teeth 35 may be locked between neck ring 60 and protrusion.

It will be appreciated that this "internal lock" 32 caused by locking teeth 35 being engaged cannot be released until the pressure in bottle 50, which pushes bottle 50 down, is fully relieved It will be appreciated that internal lock 32 shown herein above may hold any bottle with a neck ring 60 in a pronged clamp during carbonation and may ensure that, no matter what position the user may move the bottle into, pronged clamp 20 may not release bottle 50 until the pressure in the bottle is relieved as discussed herein above.

It will be appreciated that apparatus 100 may be part of the carbonation head 120 of a home carbonation system similar to that described in U.S. Pat. No. 8,920,860 or any other suitable system. It will be further appreciated that carbonation head 120 may be tiltable, via a lever 110, to allow a user to attach a bottle at an angle. Lever 110 may cause cam 15 to lower locking ring 10 over clamp 20 to restrict its teeth around the neck of bottle 50 thus providing a mechanical lock. This is shown in FIGS. 4A, 4B and 4C, to which reference is now made, which show lever 110 operating locking ring 10 via cam 15.

Figure 4A:
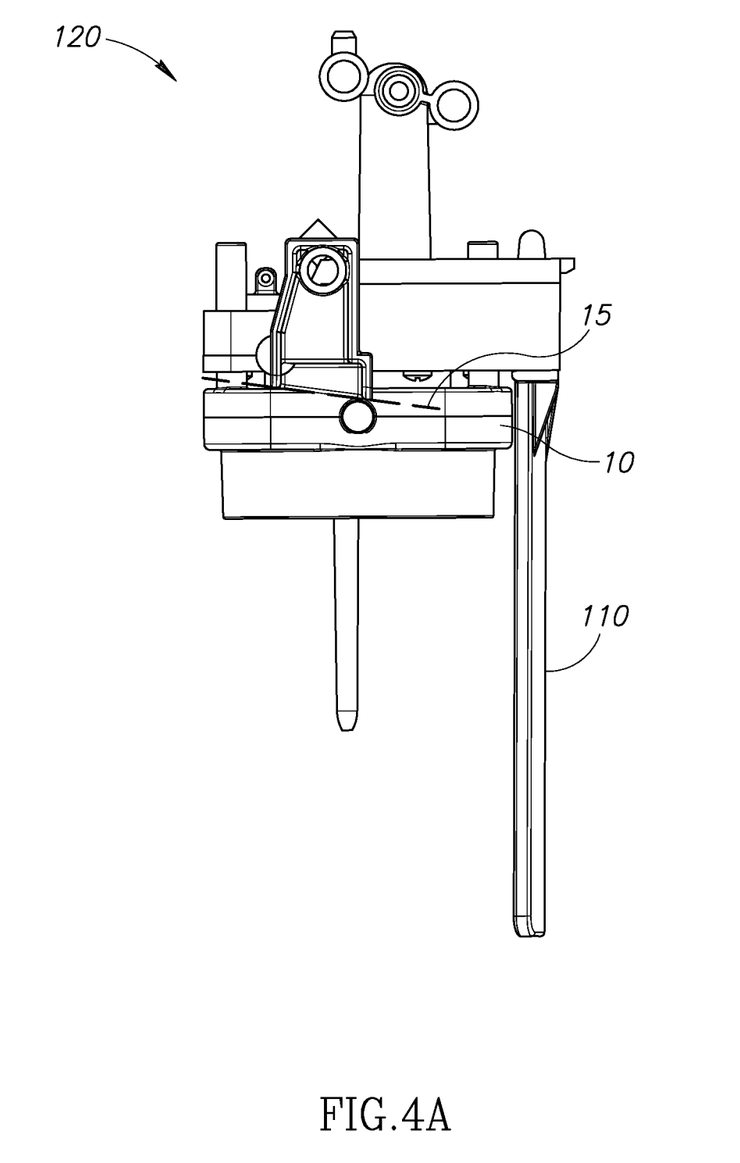
FIGS. 4A, 4B and 4C are schematic illustrations of the use of a cam with the apparatus of FIGS. 1A and 1B, constructed and operative in accordance with the present invention.

FIG. 4A illustrates cam 15 in a lowered position after the user moves bottle 50 to an upright position at the pre-carbonation stage. In this lowered position, cam 15 may push locking ring 10 downwards to constrict pronged clamp 20 (not shown) in order to initially grip bottle 50 in place.

Figure 4B:
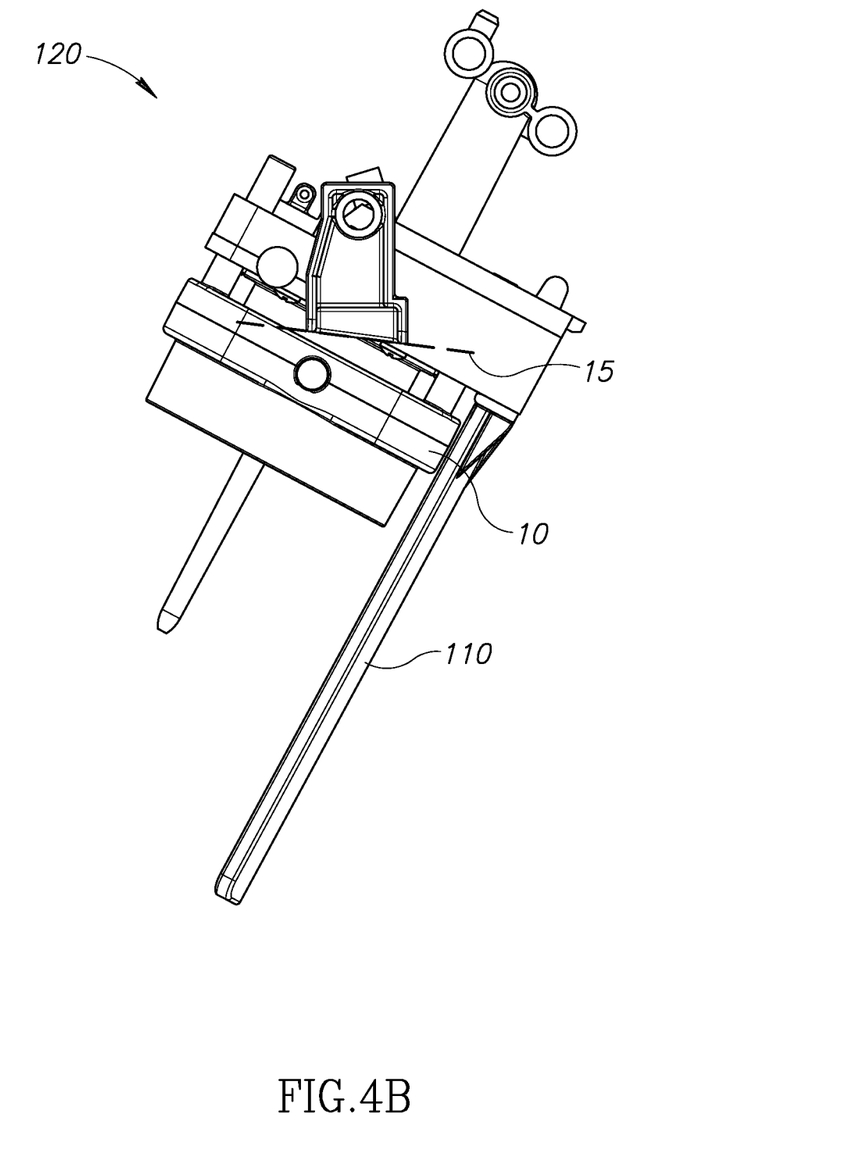
Figure 4C:
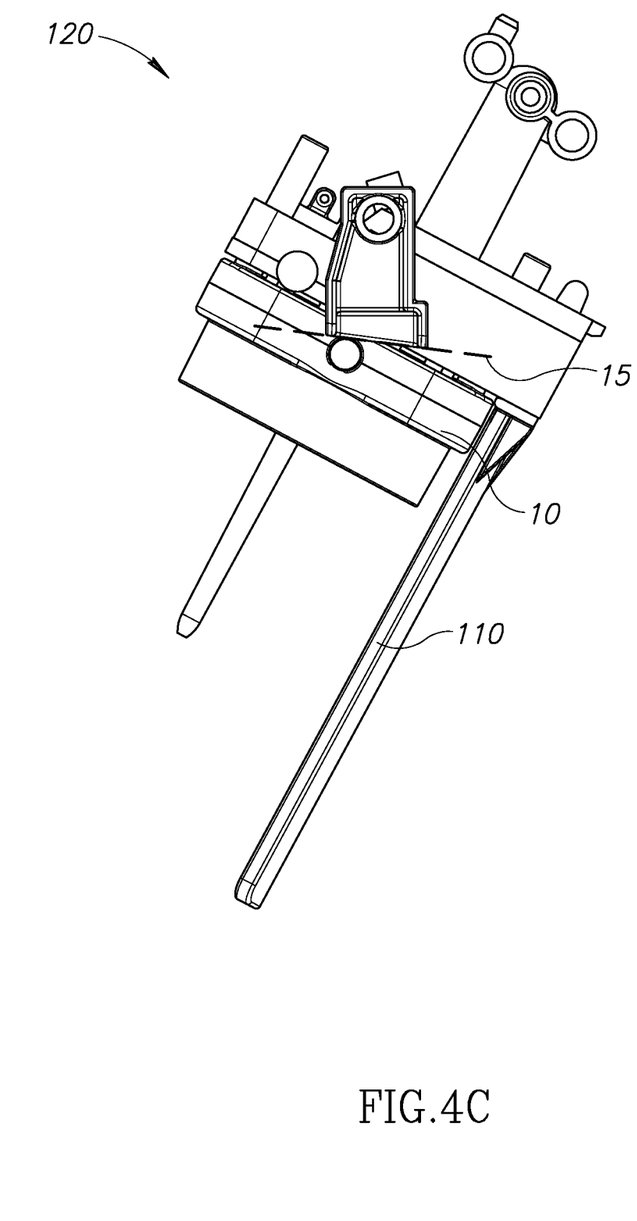

FIG. 4B illustrates locking ring 10 in a lowered state even when lever 110 is tilted out, such as in an attempt to release bottle 50 when there is still pressure in the bottle. FIG. 4C illustrates locking ring 10 in a raised state, such as occurs due to the pressure drop in the system, as discussed in more detail hereinbelow. It will be appreciated that cam 15 may be activated by pushing bottle 50 against lever 110, as described herein above.

Figure 5A:
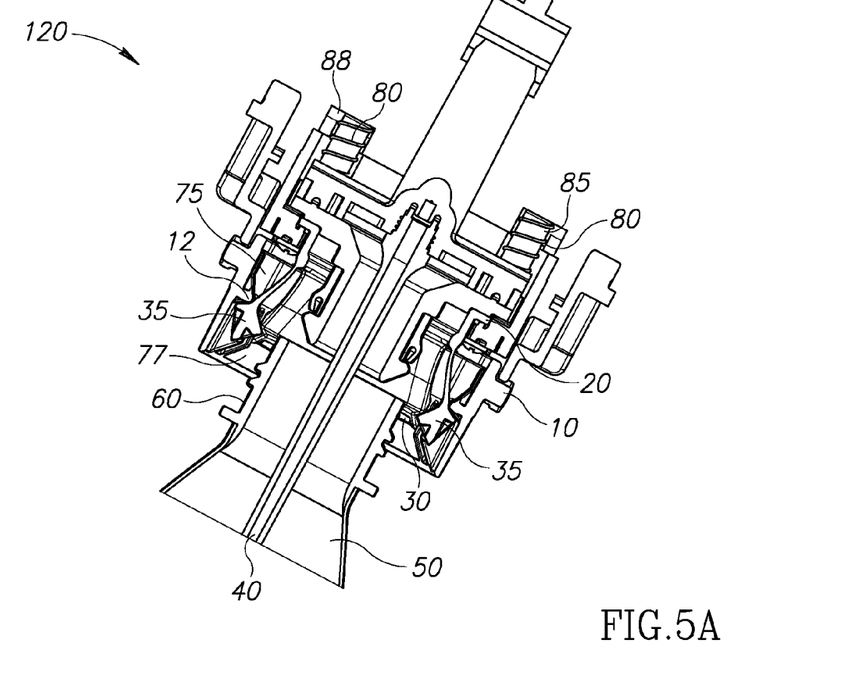
FIGS. 5A and 5B are schematic illustrations of the elements of the carbonation head operating with the apparatus FIGS. 3A and 3B, constructed and operative in accordance with the present invention.
Figure 5B:
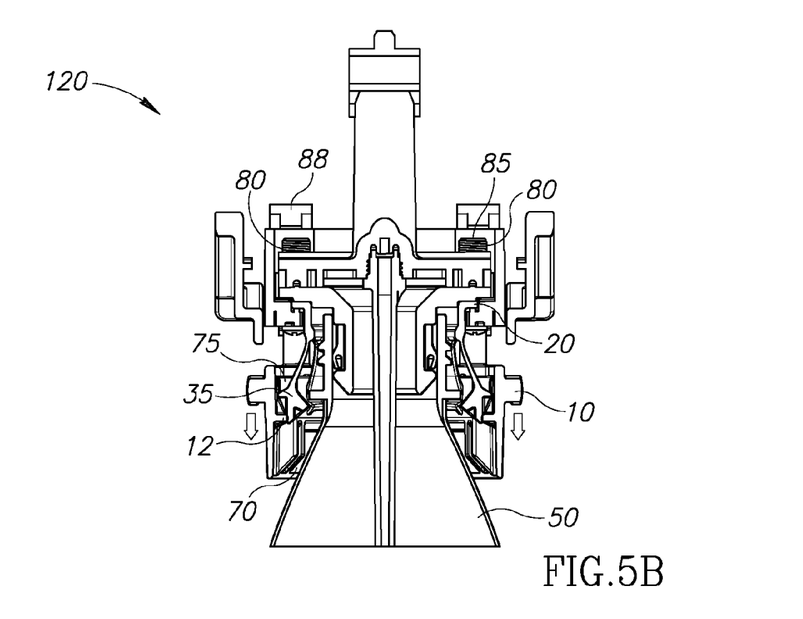

Reference is now made to FIGS. 5A and 5B which illustrate the elements of carbonation head 120 operating with integral lock 32 of FIGS. 3A and 3B in the different states of apparatus 100 pre-carbonation, as bottle 50 is attached to carbonation head 120, around a carbonation injector 40. Injector 40 may provide carbon dioxide to bottle 50 from a gas canister located elsewhere in the soda machine. As can be seen, bottle 50 may generally be held within carbonation head 120, centered around carbonation head lower 5.

FIG. 5A shows carbonation head 120 before bottle 50 is fully attached, while carbonation head 120 is tilted outwards. In this pre-carbonation state, locking ring 10 may be in its raised position, with pronged clamp 20 open and with lockable teeth 35 located within a recessed area 75 between ring 10 and neck 60 and below locking protrusion 12. It will be appreciated that while pronged clamp 20 is open, bottle 50 may easily be moved in and out.

As can be seen, in this embodiment, locking ring 10 may additionally comprise posts 85, which may be integrally connected to locking ring 10 and may extend from locking ring 10, through lower 5. Springs 80 may be coiled around posts 85 and may be held between a topping disk 87 of posts 85 and an upper surface 88 of lower 5. Springs 80 may be compressed by topping disks 87 when locking ring 10 moves away from lower 5, prior to carbonation, as discussed hereinbelow.

In the pre-carbonation stage, before lever 110 causes cam 15 to push down on locking ring 10, holding it down, springs 80 may be uncompressed. It will be appreciated that the tension of springs 80 may be set to provide a force strong enough to pull locking ring 10 upwards when no pressure is in bottle 50. However, when there is pressure in bottle 50, which may pull bottle 50 downwards to lock locking ring 10 in place, as described herein above, the force of springs 80 may be set not to overcome the force of the pressure, therefore to ensure that locking ring 10 is held in its most lowered position.

FIG. 5B illustrates the state of apparatus 100 once cam 15 has pushed locking ring 10 down, compressing springs 80 and clamping teeth 30 (situated behind teeth 35) around neck ring 60, to hold bottle 50 within carbonation head 120.

Figure 6A:
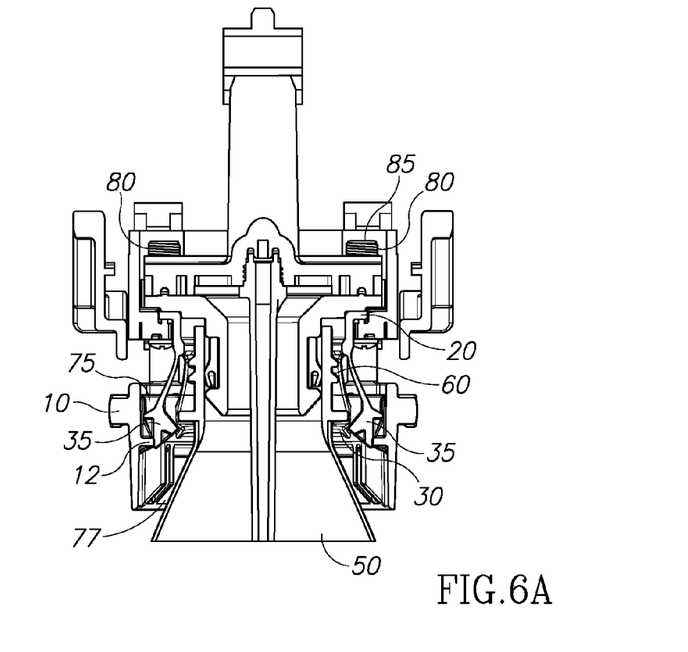
FIGS. 6A, 6B and 6C are schematic illustrations of the apparatus of FIGS. 3A and 3B during and after the carbonation stage, constructed and operative in accordance with the present invention.
Figure 6B:
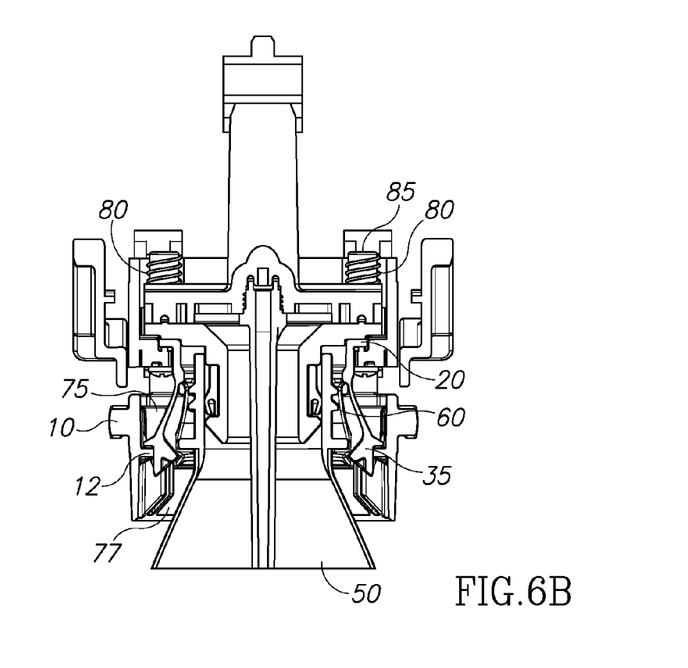
Figure 6C:
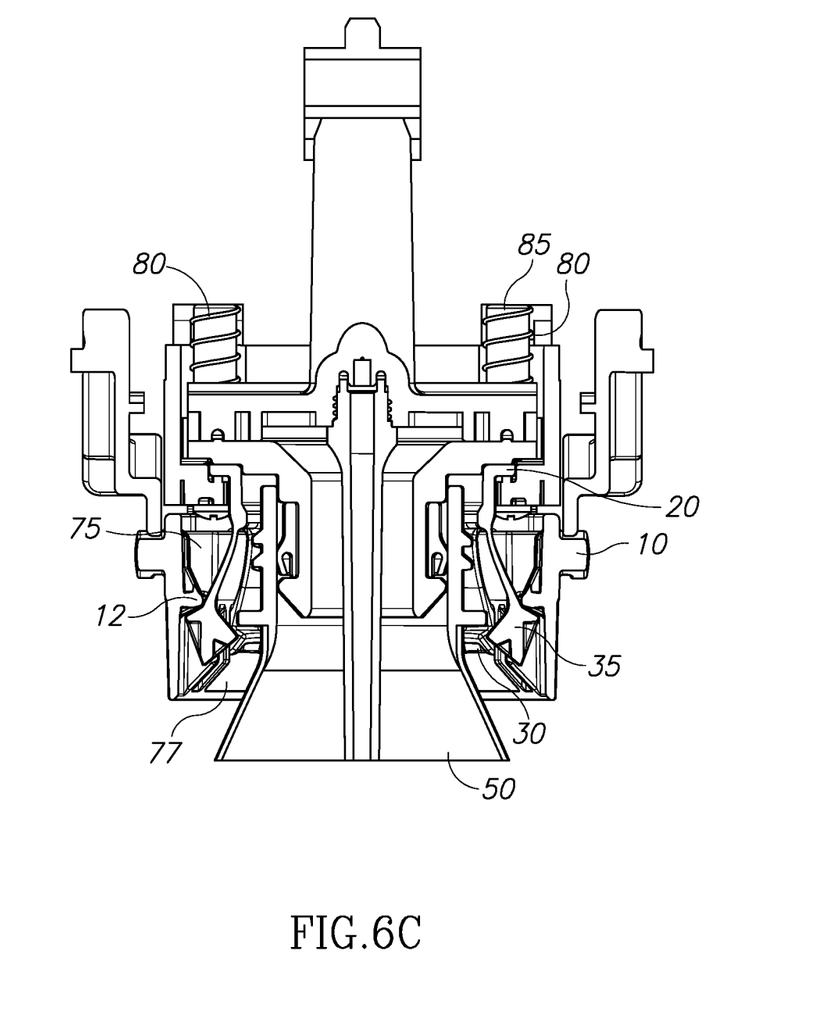

Reference is now made to FIGS. 6A, 6B and 6C, which illustrate apparatus 100 during and after the carbonation stage. It will be appreciated that once carbon dioxide ($CO_2$) has been added to the contents of bottle 50 (via carbonation tube 40), there may be a pressure build up within bottle 50. It will be appreciated that this pressure build up within bottle 50 may push bottle 50 downwards, to the position of FIG. 6A as discussed herein above. The downward motion of the bottle may push neck 60 against lockable teeth 35, causing them to open outwards. It will be further appreciated, that due to their size and shape, teeth 35 may become latched within recessed area 77 between protrusion 12 and neck ring 60. It will also be appreciated that while teeth 35 remain latched within area 77, locking ring 10 may be locked in position and cannot be raised by springs 80 as described in herein above, even if bottle 50 is tilted.

It will be further appreciated that in order to release bottle 50, lockable teeth 35 must be disengaged from area 77, enabling compressed springs 80 to decompress and pull locking ring 10 upwards, thereby releasing pronged clamp 20. The release of pressure from bottle 50 may remove the downwards force of pressure on bottle 50 and may allow springs 80 to begin raising locking ring 10 (FIG. 6B) by pushing neck ring 60 and bottle 50 upwards. This may disengage lockable teeth 35 and may enable springs 80 to fully raise locking ring 10 (FIG. 6C). In this state, pronged clamp 10 may be fully raised releasing teeth 30, such that the user may remove bottle 50 from carbonation head 120.

It will also be appreciated that since the bottle is not sealed at this stage, there is no pressure build up due to the creation of the carbonated water and thus the pressure may be fully relieved.

Figure 7A:
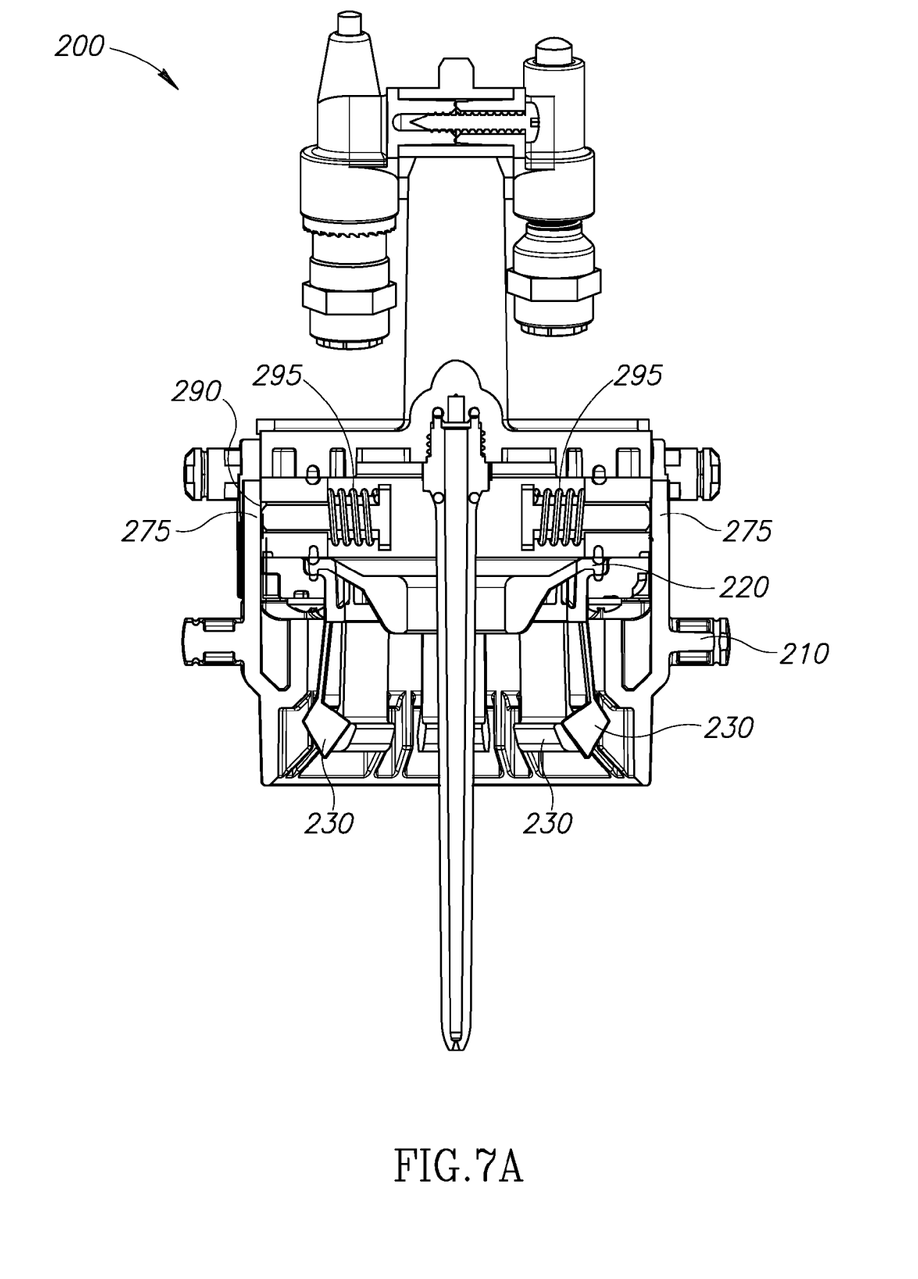
FIGS. 7A, 7B and 7C are schematic illustrations of an alternative embodiment to a pronged clamp apparatus constructed and operative in accordance with the present invention.
Figure 7B:
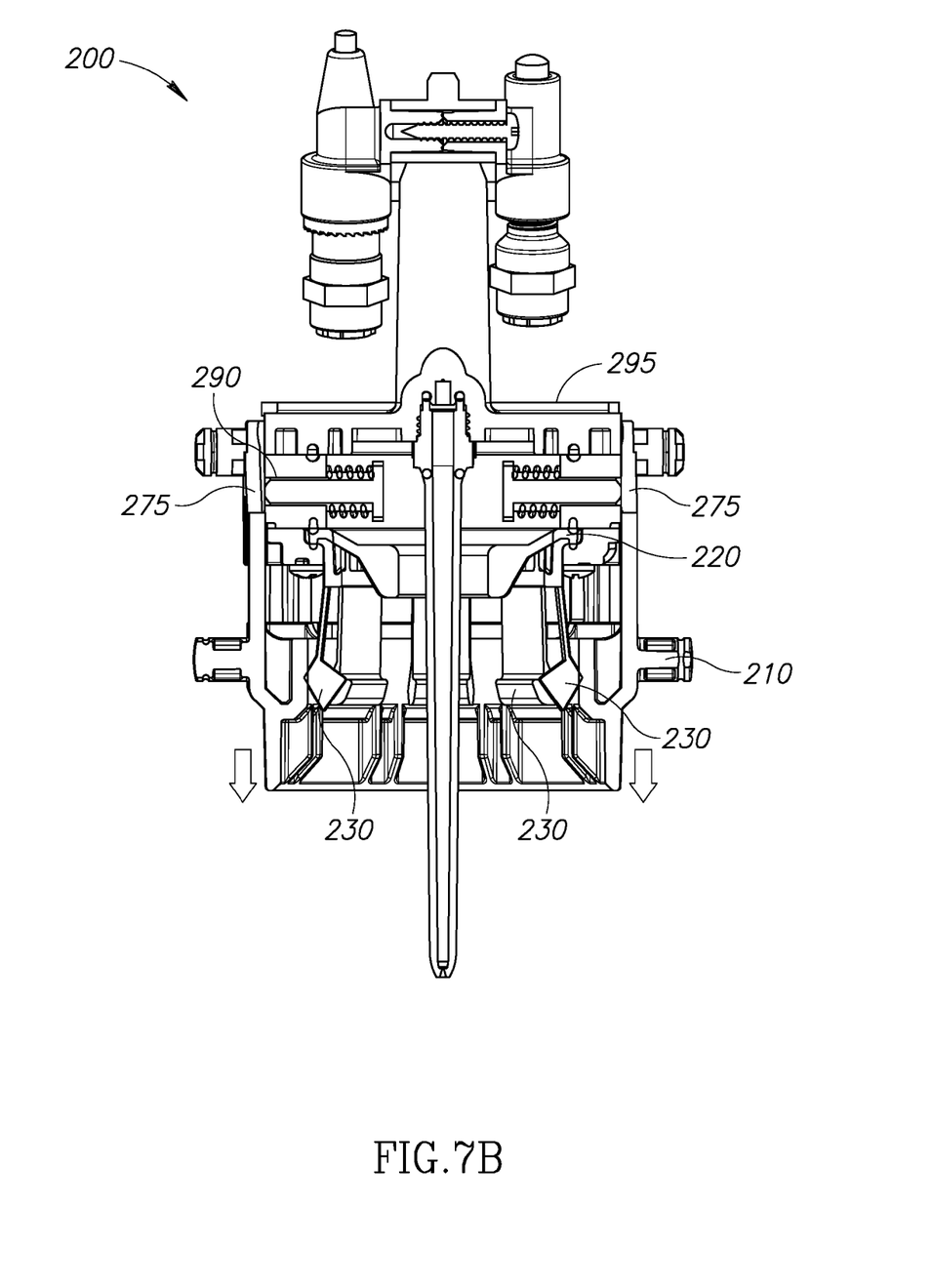
Figure 7C:
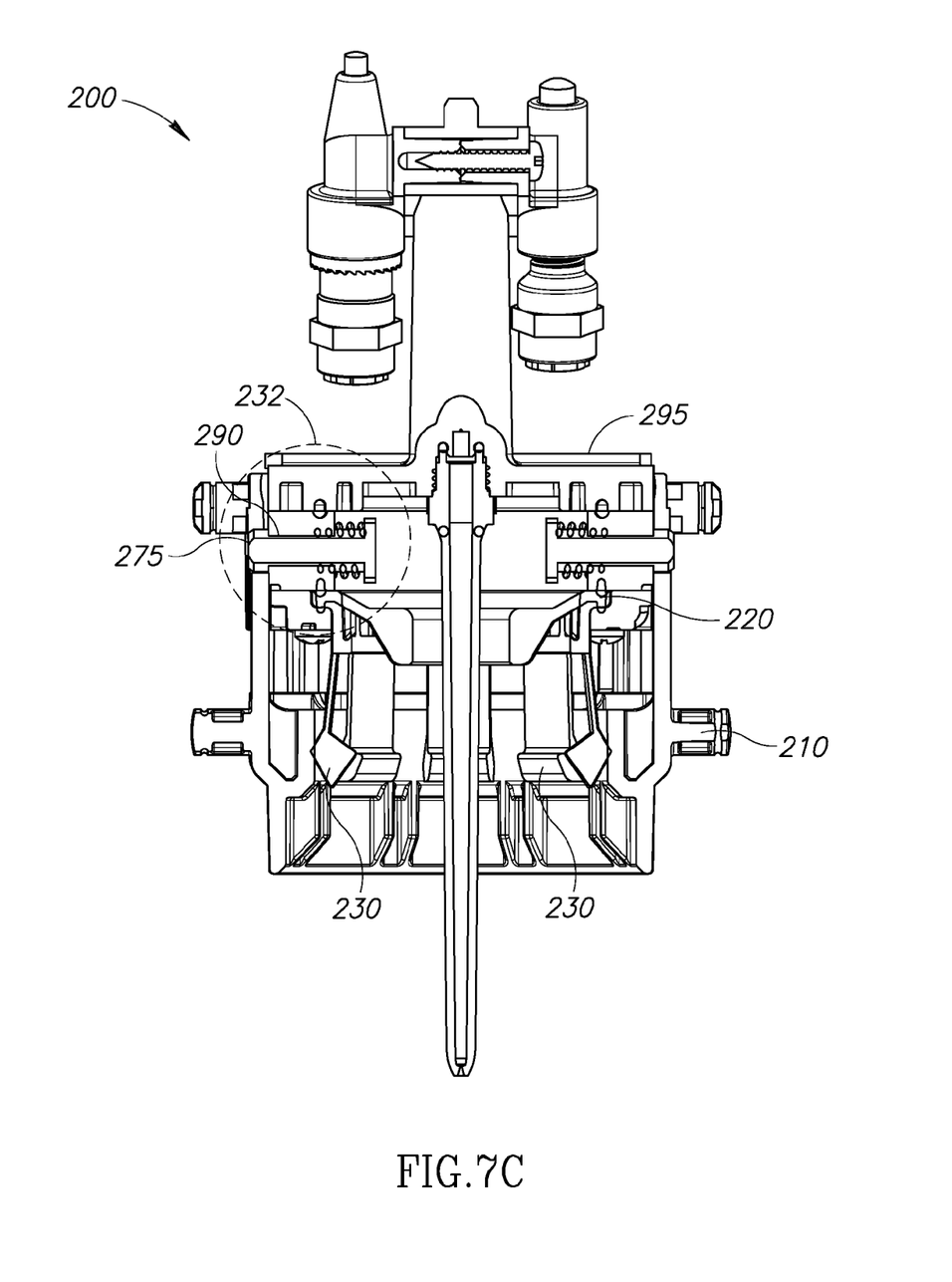

In an alternative embodiment, the carbonation apparatus may comprise two plungers that may move in and out of an aperture according to the amount of pressure in the system. Reference is now made to FIGS. 7A, 7B and 7C which illustrate an alternative pronged clamp apparatus with an integral lock 200 according to an embodiment of the present invention.

Apparatus 200 may comprise a lower 205, a locking ring 210, a pronged clamp 220 and springs 280. Lower 205 may further comprise two plungers 290 positioned within springs 295. Lower 205 may also comprise apertures 275 within its outer walls, large enough for plungers 290 to fit through as discussed in more detail herein below.

It will be appreciated that in this embodiment, the elements may have similar functionality to the elements of apparatus 100 as described herein above. Pronged clamp 220 may comprise equally sized teeth 230 similar to the pronged clamp apparatus as described in U.S. Pat. No. 8,920,860.

FIG. 7A shows the pre-carbonation state of apparatus 200, before bottle 50 has been attached, with locking ring 210 at its raised position and with pronged clamp 220 open. Bottle 50 may be attached to apparatus 200 as discussed herein above with lever 110 causing cam 15 (not shown) to lower locking ring 210 thus restricting pronged clamp 220 so that bottle 50 is held in place (as is shown in FIG. 7B which illustrates the state of apparatus 200, bottle 50 is not shown).

When pressure builds up in bottle 50 during the carbonation process, the force of the pressure may cause springs 295 to contract thus pushing plungers 200 outwards from their dormant state as is illustrated in FIG. 7C.

Plungers 290 may be pushed outwards through apertures 275, thus preventing locking ring 210 from rising and releasing pronged clamp 220. It will be appreciated that the locking of plungers 290 in apertures 275 may prevent springs 280 from being able to raise locking ring 210 forms an interlock 232 and thus pronged clamp 220 remains constricted and bottle 50 cannot be released.

It is only when bottle 50 is depressurized and plungers 290 retract inwards pulled by springs 295 that springs 280 may raise locking ring 210 as described herein above which in turn may release pronged clamp 220 allowing bottle 50 to be released.

Thus both apparatuses 100 and 200 may comprise interlock systems which may override the initial locking mechanism provided by lever 110 and ring 10 (as described herein above). Hence a bottle may not be removed from the home carbonation system once carbonation has ended, even when tilted outwards releasing a cam lock until it has depressurized since until locking ring 10 is raised, it cannot remove its constriction of pronged clamp 20.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A pronged clamp apparatus for attaching a soda bottle to a home use carbonation machine, the apparatus comprising:

a pronged clamp to receive said bottle at a non-upright position prior to carbonation, said bottle having a neck ring, to attach said bottle to said carbonation machine when a user moves said bottle towards an upright position;

a locking mechanism to lock said bottle to said carbonation machine via said neck ring in said upright position during carbonation; and an interlock operative within said locking mechanism utilizing the downward movement of said bottle under pressure to prevent the unlocking of said locking mechanism when there is excess pressure in said bottle.

2. The apparatus according to claim 1 and wherein said pronged clamp comprises a plurality of equal sized teeth.

3. The apparatus according to claim 2 and wherein said interlock comprises two lockable teeth each having an angled upper surface;

wherein said two lockable teeth are attached to said pronged clamp;

wherein said two lockable teeth are sized and shaped differently from said equal sized teeth; and and wherein said two lockable teeth are situated on opposing sides of said pronged clamp.

4. The apparatus according to claim 3 and also comprising a locking ring having a locking protrusion to engage with said two lockable teeth when extended outwards when said bottle is pushed downwards by said excess pressure.

5. The apparatus according to claim 4 and wherein said apparatus also comprises:

a cam to lower said locking ring;

springs to raise said locking ring, said springs having a set force to raise said locking ring when there is no pressure in said bottle; and wherein said engaged two lockable teeth prevent said springs from raising said locking ring.

6. The apparatus according to claim 1 and wherein said interlock comprises:

two plungers situated perpendicularly to said pronged clamp ;

two apertures sized to fit said plungers; and plunger springs to contract under pressure to push said two plungers through said two apertures.

7. The apparatus according to claim 6 and wherein said locking mechanism comprises a locking ring: and wherein said apparatus also comprises:

a cam to lower said locking ring;

a lever to activate said cam; and springs to raise said locking ring, said springs having a set force to raise said locking ring when there is no pressure in said bottle; and wherein said two plungers situated within said apertures prevent said springs from raising said locking ring.

\* \* \* \* \*